United States Patent
Gou et al.

(10) Patent No.: US 12,213,167 B2
(45) Date of Patent: Jan. 28, 2025

(54) CHANNEL CONFLICT PROCESSING METHOD AND APPARATUS, DEVICE, AND STORAGE MEDIUM

(71) Applicant: ZTE CORPORATION, Shenzhen (CN)

(72) Inventors: Wei Gou, Shenzhen (CN); Peng Hao, Shenzhen (CN); Xianghui Han, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 249 days.

(21) Appl. No.: 17/793,622

(22) PCT Filed: Jan. 14, 2021

(86) PCT No.: PCT/CN2021/071927
§ 371 (c)(1),
(2) Date: Jul. 18, 2022

(87) PCT Pub. No.: WO2021/143786
PCT Pub. Date: Jul. 22, 2021

(65) Prior Publication Data
US 2023/0047645 A1 Feb. 16, 2023

(30) Foreign Application Priority Data
Jan. 17, 2020 (CN) .......................... 202010054488.1

(51) Int. Cl.
*H04W 72/566* (2023.01)
*H04L 5/00* (2006.01)

(52) U.S. Cl.
CPC ......... *H04W 72/569* (2023.01); *H04L 5/0053* (2013.01); *H04L 5/0064* (2013.01)

(58) Field of Classification Search
CPC ... H04W 72/569; H04W 72/56; H04W 72/02; H04W 72/0446; H04W 72/21;
(Continued)

(56) References Cited

U.S. PATENT DOCUMENTS 11,290,968 B2 * 3/2022 MolavianJazi ....... H04W 72/23
11,943,061 B2 * 3/2024 Yin ........................ H04L 5/0055
(Continued)

FOREIGN PATENT DOCUMENTS

| CN | 110139383 A | 8/2019 |
| CN | 110149705 A | 8/2019 |

(Continued)

OTHER PUBLICATIONS

Alabbasi et al. U.S. Appl. No. 62/932,483, filed Nov. 7, 2019 (Year: 2019).*

(Continued)

*Primary Examiner* — Wutchung Chu
(74) *Attorney, Agent, or Firm* — Morgan, Lewis & Bockius LLP (57) ABSTRACT

Provided are a channel conflict processing method and apparatus, a device, and a storage medium. The channel conflict processing method includes: in the case where a transmission resource on a high-priority uplink channel of a UE and a transmission resource on a low-priority uplink channel of the UE overlap in time domain, determining the start position for transmission cancellation of the low-priority uplink channel; and canceling the transmission resource on the low-priority uplink channel according to the start position for transmission cancellation.

15 Claims, 5 Drawing Sheets

(58) Field of Classification Search
CPC ....... H04L 5/0053; H04L 5/0064; H04L 1/08; H04L 1/0026; H04L 1/0027; H04L 1/1671; H04L 1/1854; H04L 1/1861; H04L 5/0055
See application file for complete search history.

(56) References Cited

U.S. PATENT DOCUMENTS

| | | | |
|---|---|---|---|
| 2020/0008177 A1 | 1/2020 | Huang et al. | |
| 2020/0322971 A1* | 10/2020 | Jung | H04L 5/0064 |
| 2020/0367265 A1* | 11/2020 | Wang | H04L 5/0055 |
| 2021/0029719 A1* | 1/2021 | Zhou | H04L 5/0055 |
| 2021/0105766 A1* | 4/2021 | Wang | H04L 1/1819 |
| 2021/0227574 A1* | 7/2021 | Hosseini | H04W 72/044 |
| 2021/0337536 A1* | 10/2021 | Li | H04L 5/0055 |
| 2022/0116952 A1* | 4/2022 | Lee | H04W 72/0446 |
| 2022/0232545 A1* | 7/2022 | Mukherjee | H04L 5/0048 |
| 2022/0248422 A1* | 8/2022 | Lu | H04W 72/1268 |
| 2022/0264595 A1* | 8/2022 | Xiao | H04W 72/569 |
| 2022/0295504 A1* | 9/2022 | Lee | H04L 1/1854 |
| 2022/0304001 A1* | 9/2022 | Lee | H04W 72/0446 |
| 2022/0346118 A1* | 10/2022 | Wu | H04L 1/1825 |
| 2022/0353899 A1* | 11/2022 | Xiao | H04W 72/23 |
| 2022/0394753 A1* | 12/2022 | Alabbasi | H04W 72/02 |
| 2022/0394764 A1* | 12/2022 | Jiang | H04W 72/56 |

FOREIGN PATENT DOCUMENTS

| | | |
|---|---|---|
| CN | 110366245 A | 10/2019 |
| CN | 111901868 A | 11/2020 |
| CN | 111901882 A | 11/2020 |
| KR | 20220128415 A * | 9/2022 ........... H04L 1/0026 |
| TW | 201947987 A | 12/2019 |
| WO | WO-2019160332 A1 | 8/2019 |

OTHER PUBLICATIONS

Extended European Search Report for Application No. 21740824.4, dated Jan. 4, 2024, 10 pages.
Taiwan Office Action for Application No. 109137871, dated Nov. 16, 2023, 40 pages including English translation.
Ericsson, "On UCI Multiplexing on PUCCH", *3GPP TSG RAN WG1 Meeting #93 R1-1807251*, Busan, South Korea, May 21-25, 2018.
Vivo, "UCI enhancements for URLLC", *3GPP TSG RAN WG1 #99 R1-1912031*, Reno, USA, Nov. 18-22, 2019.
Oppo, "Summary#3 on UCI enhancements for URLLC", *3GPP TSG RAN WG1 #99 R1-1913535*, Reno, USA, Nov. 18-22, 2019.
Zte, "UL control enhancements for NR URLLC", *3GPP TSG RAN WG1 #99 R1-1911964*, Reno, USA, Nov. 18-22, 2019.
International Search Report for Application No. PCT/CN2021/071927, dated Mar. 26, 2021, 6 pages including English translation.
Moderator Qualcomm, "Summary #2 of email discussion [101-e-NR-L1enh-URLLC-HARQ&Scheduling-01]", *3GPP TSG RAN WG1 #101e R1-2004977*, Jun. 5, 2020 (Jun. 5, 2020), pp. 1-10.
Nokia et al., "UL inter-UE eMBB and URLLC multiplexing enhancements", *3GPP TSG RAN WG1 Meeting #98-Bis R1-1910868*, Oct. 20, 2019 (Oct. 20, 2019), section 2.
Vivo, "UL inter-UE Tx prioritization for URLLC", *3GPP TSG RAN WG1 Meeting #95 R1-1812318*, Nov. 16, 2018 (Nov. 16, 2018), section 2.
"3rd Generation Partnership Project; Technical Specification Group Radio Access Network; NR; Physical layer procedures for data" (Release 15), 3GPP TS 38.214 V15.8.0 (Dec. 2019).

\* cited by examiner

FIG. 1

```
When a transmission resource on a high-priority uplink channel of a UE
and a transmission resource on a low-priority uplink channel of the UE     ~ 101
overlap in time domain, determine the start position for transmission
        cancellation of the low-priority uplink channel
```

```
Cancel the transmission resource on the low-priority uplink channel    ~ 102
       according to the start position for transmission cancellation
```

FIG. 2

```
When a transmission resource on the high-priority uplink channel and a
 transmission resource on the low-priority uplink channel overlap in time
  domain, determine the position that is the threshold interval after the    ~ 201
   end symbol of the channel corresponding to the high-priority uplink
         channel as the start position for transmission cancellation
```

```
  Cancel the transmission resource on the low-priority uplink channel    ~ 202
         from the start position for transmission cancellation
```

CHANNEL CONFLICT PROCESSING METHOD AND APPARATUS, DEVICE, AND STORAGE MEDIUM

CROSS-REFERENCE TO RELATED APPLICATIONS

This is a National Stage Application filed under 35 U.S.C. 371 based on International Patent Application No. PCT/CN2021/071927, filed on Jan. 14, 2021, which claims priority to Chinese Patent Application No. 202010054488.1 filed on Jan. 17, 2020, disclosures of both of which are incorporated herein by reference in their entireties.

TECHNICAL FIELD

The present application relates to wireless communication networks, for example, a channel conflict processing method and apparatus, a device, and a storage medium.

BACKGROUND

In new radio (NR) of the 5th generation mobile networks (5G), the same user equipment (UE) can support different types of services, such as transmission of enhanced mobile broadband (eMBB) service and transmission of an uplink channel related to the eMBB service, and can also support transmission of ultra-reliable low-latency communications (URLLC) service and transmission of an uplink channel related to the URLLC service. However, considering the complexity of the implementation of UEs, one UE is allowed to transmit merely one uplink channel in a certain period of time. For example, when two uplink channels of the UE overlap in time domain, the UE can select merely one of the two uplink channels to transmit. Another of the two uplink channels should be canceled in whole or in part.

In the discussion of NR, it is proposed that when multiple uplink transmission channels of the same UE overlap in time domain, the uplink transmission on a low-priority uplink transmission channel is canceled in whole or in part, and the uplink transmission on a high-priority uplink transmission channel is normally transmitted. However, considering that the uplink transmission on the low-priority uplink transmission channel is canceled, the uplink transmission on the low-priority uplink transmission channel is repeated. If the uplink transmission is a control signaling, for example, a hybrid automatic repeat request acknowledgements (HARQ-ACK) physical uplink control channel (PUCCH), the downlink data corresponding to the HARQ-ACK needs to be repeated. The direct cancellation of the uplink transmission on the low-priority uplink transmission channel can reduce the uplink transmission efficiency of the low-priority uplink transmission channel.

SUMMARY

The present application provides a channel conflict processing method and apparatus, a device, and a storage medium.

An embodiment of the present application provides a channel conflict processing method. The method includes, when a transmission resource on a high-priority uplink channel and a transmission resource on a low-priority uplink channel of the same UE overlap in time domain, determining the start position for transmission cancellation of the low-priority uplink channel; and canceling the transmission resource on the low-priority uplink channel according to the start position for transmission cancellation.

An embodiment of the present application provides a channel conflict processing apparatus. The apparatus includes a cancellation position determination module and a cancellation execution module.

The cancellation position determination module is configured to, when a transmission resource on a high-priority uplink channel and a transmission resource on a low-priority uplink channel of the same UE overlap in time domain, determine the start position for transmission cancellation of the low-priority uplink channel. The cancellation execution module is configured to cancel the transmission resource on the low-priority uplink channel according to the start position for transmission cancellation.

An embodiment of the present application provides a device. The device includes one or more processors and a memory.

The memory is configured to store one or more programs. When executed by the one or more processors, the one or more programs cause the one or more processors to implement the channel conflict processing method according to any embodiment of the present application.

An embodiment of the present application provides a computer-readable storage medium configured to store a computer program which, when executed by a processor, implements the channel conflict processing method according to any embodiment of the present application.

DETAILED DESCRIPTION

Embodiments of the present application are described below in conjunction with drawings.

Figure 1:
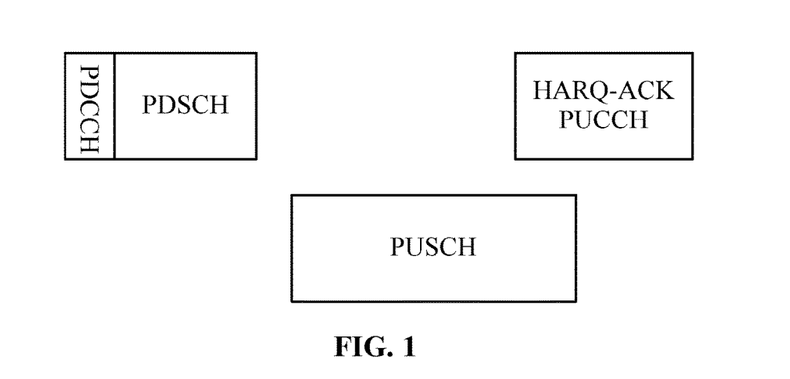
FIG. 1 is an example diagram of channel conflict according to an embodiment of the present application.

FIG. 1 is an example diagram of channel conflict according to an embodiment of the present application. Referring to FIG. 1, the transmission resources on one HARQ-ACK PUCCH and the transmission resources on another physical uplink shared channel (PUSCH) (with uplink data) overlapping in time domain is taken as an example. The HARQ-ACK PUCCH is a high-priority uplink channel. The PUSCH is a low-priority uplink channel. The resource transmission on the HARQ-ACK PUCCH and the resource transmission on the PUSCH overlap in time domain, resulting in conflict between the HARQ-ACK PUCCH and the PUSCH. In some cases, a low-priority uplink channel has already been transmitted, and a high-priority uplink channel appears at this time. Therefore, a reasonable start cancellation position can be set to solve the problem of low uplink transmission efficiency of the low-priority uplink channel caused by the channel conflict in actual transmission.

Figure 2:
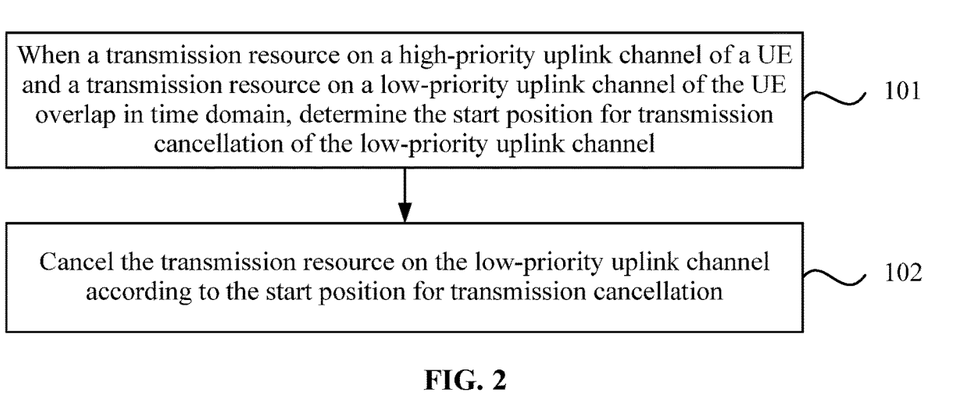
FIG. 2 is a flowchart of a channel conflict processing method according to an embodiment of the present application.

FIG. 2 is a flowchart of a channel conflict processing method according to an embodiment of the present application. The embodiment of the present application may be applicable to the case of channel conflict in resource transmission. The method may be executed by a channel conflict processing apparatus in this embodiment of the present application. The apparatus may be implemented in a manner of software and/or hardware. Referring to FIG. 1, the method provided by the embodiment of the present application specifically includes the following steps.

In step 101, when a transmission resource on a high-priority uplink channel and a transmission resource on a low-priority uplink channel of the same UE overlap in time domain, the start position for transmission cancellation of the low-priority uplink channel is determined.

The high-priority uplink channel is a channel which can preferentially transmit resources. When the high-priority uplink channel and the low-priority uplink channel transmit resources simultaneously, the high-priority uplink channel can preferentially transmit resources, and then the low-priority uplink channel transmits resources after the resources on the high-priority uplink channel are transmitted.

In this embodiment of the present application, overlapping in time domain may refer to the overlap of resource transmission time when the high-priority uplink channel and the low-priority uplink channel transmit resources. For example, when the resource transmission on the low-priority uplink channel has not ended, and the resource transmission on the high-priority uplink channel has started, at this time, the overlapping in time domain exists between a low-priority signal and the high-priority uplink channel. The start position for transmission cancellation may be the start position of canceling the transmission resources on the low-priority uplink channel during channel conflict. Since the direct cancellation of the resource transmission on the low-priority uplink channel can reduce the uplink transmission efficiency of the low-priority uplink channel, by determining the start position for transmission cancellation, only the canceled transmission resource on the low-priority uplink channel can be transmitted during repeat. Thus, the uplink transmission efficiency of the low-priority uplink channel is improved.

When it is determined that transmission resources on multiple uplink transmission channels of a UE overlap in time domain, the start position of canceling the resource transmission on a low-priority uplink channel is determined according to the high-priority uplink channel of the uplink transmission channels.

In step 102, the transmission resource on the low-priority uplink channel is canceled according to the start position for transmission cancellation.

In this embodiment of the present application, transmission resource on the low-priority uplink channel may be canceled according to the start position for transmission cancellation, specifically, may be canceled in whole or in part. For example, some transmission resources after the start position for transmission cancellation on the low-priority uplink channel may be canceled. When repeat is performed, merely the some transmission resources canceled on the low-priority uplink channel may be repeated.

According to technical solutions in this embodiment of the present application, when transmission resources on the high-priority uplink channel and the low-priority uplink channel overlap in time domain, the start position for transmission cancellation corresponding to the low-priority uplink channel is determined. The transmission resource on the low-priority uplink channel is canceled according to the start position for transmission cancellation, thereby reducing the influence of the high-priority uplink channel on the transmission resources on the low-priority uplink channel, and improving the transmission efficiency of the low-priority uplink channel.

Figure 3:
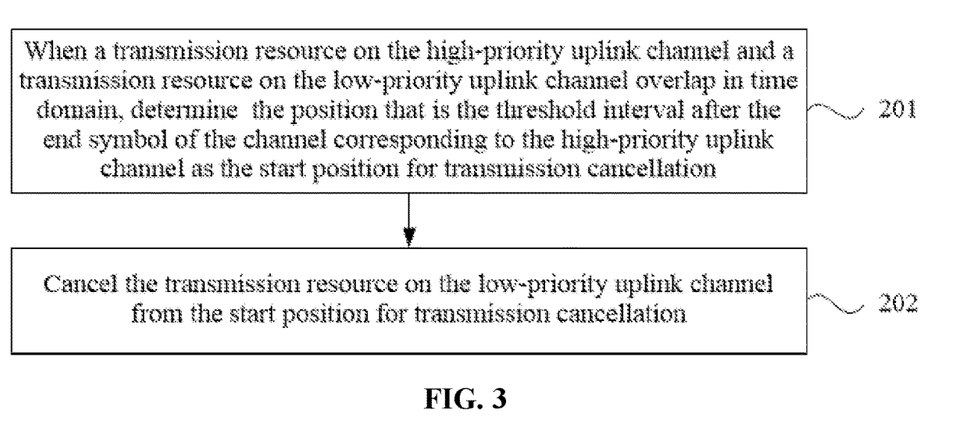
FIG. 3 is a flowchart of a channel conflict processing method according to an embodiment of the present application.

FIG. 3 is a flowchart of a channel conflict processing method according to an embodiment of the present application. The embodiment of the present application describes a manner of determining a start position for transmission cancellation. Referring to FIG. 3, the method in this embodiment of the present application specifically includes the following operations.

In step 201, when the transmission resource on the high-priority uplink channel and the transmission resource on the low-priority uplink channel overlap in time domain, the position that is the threshold interval after the end symbol of the channel corresponding to the high-priority uplink channel is determined as the start position for transmission cancellation.

The end symbol may be the last orthogonal frequency-division multiplexing (OFDM) symbol of the channel corresponding to the high-priority uplink channel under the time domain and, specifically, may be the end position of the end symbol. The corresponding channel may be a PDSCH or a PDCCH. The threshold interval may be a interval for determining the cancellation of the transmission resources on the low-priority uplink channel. The start position of the threshold interval may be the end symbol of the channel corresponding to the high-priority uplink channel. The end position of the threshold interval may be the start position for transmission cancellation corresponding to the low-priority uplink channel.

In this embodiment of the present application, in the case where the high-priority uplink channel and the low-priority uplink channel of a UE overlap in time domain when resources are transmitted, the end position of the PDSCH corresponding to the transmission resources on the high-priority uplink channel can be determined, specifically, may be the OFDM symbol at the end of the high-priority uplink channel. The OFDM symbol may be used as the end symbol of the transmission resources on the high-priority uplink channel. A position that is a threshold interval after the end symbol may be used as a start position for transmission cancellation.

In an embodiment, the threshold interval includes at least one of a time amount interval or an OFDM symbol interval.

The threshold interval may be a time amount interval or an OFDM symbol interval. It is understood that when the threshold interval may be the time amount interval and the OFDM symbol interval at the same time, there may be a conversion relationship between the time interval and the OFDM symbol interval. For example, a pre-agreed conversion coefficient can be used to convert the time interval and the OFDM symbol interval. In an embodiment, the interval threshold may be $T_{proc,1}$ in standard TS38.214, any one of N, N1, $T_{proc,2}$, N2, or N3, or a pre-agreed value. N, N1, N2, or N3 may be an OFDM symbol interval defined in TS38.214 or TS38.213. $T_{proc,1}$ and $T_{proc,2}$ may be time intervals defined in TS38.214 or TS38.213.

In an embodiment, the threshold interval includes a first threshold interval and a second threshold interval. Alternatively, the threshold interval includes a first threshold interval.

In this embodiment of the present application, the threshold interval may consist of a first threshold interval and a second threshold interval. The second threshold interval may be optional. For example, the threshold interval may be B. The first threshold interval is B1. The second threshold interval may be B2. B=B1+B2. B1 is required. B2 is optional. When B2 does not exist, the threshold interval B=B1. B1 may be $T_{proc,1}$ in standard TS38.214, any one of N, N1, $T_{proc,2}$, N2, or N3, or a pre-agreed value. N, N1, N2, or N3 may be an OFDM symbol interval defined in TS38.214 or TS38.213. $T_{proc,1}$ and $T_{proc,2}$ may be time intervals defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B1 is defined as $T_{proc,2}$, then in $T_{proc,2}$, $d_{2,1}=0$.

In step 202, the transmission resource on the low-priority uplink is canceled from the start position for transmission cancellation.

The start OFDM symbol of the transmission resource on the low-priority uplink channel may be used as the start position of the transmission resource on the low-priority uplink channel. The start position may be compared with the start position for transmission cancellation. The manner of canceling the resource transmission on the low-priority uplink channel may be determined according to the context of the start position and the start position for transmission cancellation. It can be understood that, in this embodiment of the present application, the manner of canceling the resource transmitted on the low-priority uplink channel may include canceling all resources transmitted on the low-priority uplink channel or canceling some resources transmitted after the start position for transmission cancellation on the low-priority uplink channel.

Figure 4:
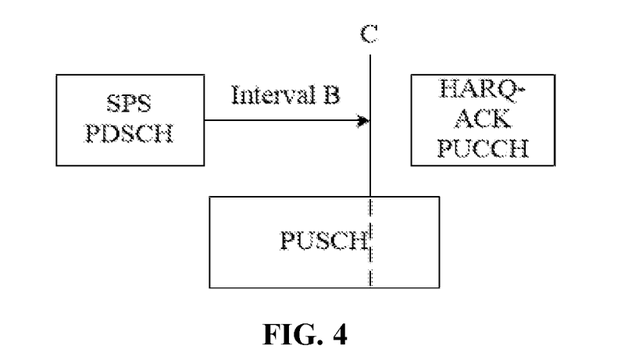
FIG. 4 is an example diagram of a channel conflict processing method according to an embodiment of the present application.

Exemplarily, FIG. 4 is an example diagram of a channel conflict processing method according to an embodiment of the present application. In FIG. 4, a semi-persistent scheduling (SPS) PDSCH for semi-persistent transmission is taken as an example. A high-priority uplink channel HARQ-ACK PUCCH and a low-priority uplink channel PUSCH overlap in time domain. Position C that is the interval B after the end of the last symbol of the SPS PDSCH corresponding to the HARQ-ACK PUCCH is used as the start position for transmission cancellation of the low-priority uplink channel PUSCH. That is, if the transmission on the low-priority uplink channel PUSCH does not end at position C, the resource transmission after position C is canceled. If the transmission on the low-priority uplink channel PUSCH ends at position C or before, it can mean that the transmission on the low-priority uplink channel PUSCH actually completes. In this embodiment of the present application, the interval B may include B1 and B2. B1 is required. B2 is optional. B1 may be $T_{proc,1}$ in standard TS38.214, any one of N, N1, $T_{proc,2}$, N2, or N3, or a pre-agreed value. N, N1, N2, or N3 may be an OFDM symbol interval defined in TS38.214 or TS38.213. $T_{proc,1}$ and $T_{proc,2}$ may be time intervals defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B1 is defined as $T_{proc,2}$, then in $T_{proc,2}$, $d_{2,1}=0$.

When subcarrier intervals used by PDCCHs corresponding to the HARQ-ACK PUCCH and the PUSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on a low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on code block groups (CBGs), thereby improving the transmission efficiency of the low-priority PUSCH.

According to technical solutions in this embodiment of the present application, when transmission resources on the high-priority uplink channel and the low-priority uplink channel overlap in time domain, the position that is the threshold interval after the end symbol of the channel corresponding to the high-priority uplink channel is determined as the start position for transmission cancellation to acquire the start position of the transmission resource on the low-priority uplink channel. The transmission resource on the low-priority uplink channel is canceled through the start position and the start position for transmission cancellation so that the control of the resource transmission on the low-priority uplink channel is canceled, the influence of the high-priority uplink channel on the low-priority uplink channel is reduced, and the transmission efficiency of the low-priority channel is improved.

In an embodiment, the start position for transmission cancellation of the low-priority uplink channel is determined, including determining the position that is the threshold interval before the start symbol of the high-priority uplink channel as the start position for transmission cancellation.

In the case where the high-priority uplink channel and the low-priority uplink channel of a UE overlap in time domain when resources are transmitted, the start position of transmission resources on the high-priority uplink channel can be determined, specifically, may be the OFDM symbol at the start of the high-priority uplink channel. The OFDM symbol may be used as the start symbol of the transmission resources on the high-priority uplink channel. A position that is a threshold interval before the start symbol may be used as a start position for transmission cancellation.

Figure 5:
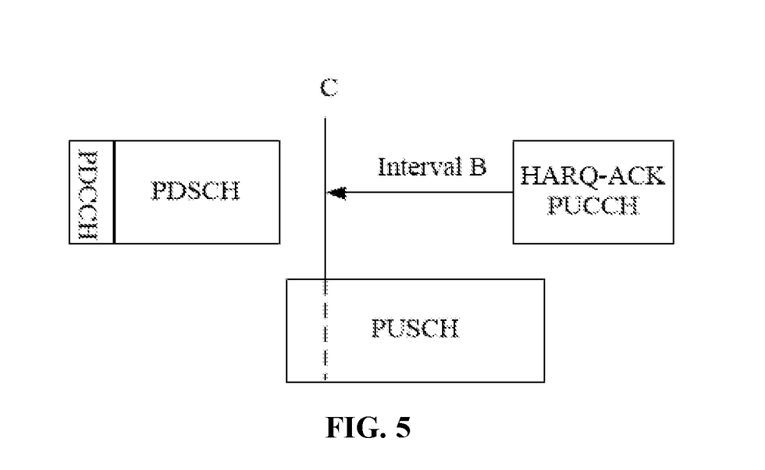
FIG. 5 is an example diagram of a channel conflict processing method according to an embodiment of the present application.

In this embodiment of the present application, for the start position for transmission cancellation of the low-priority uplink channel, the start position may be a symbol position or a time point. The start position as a symbol position is taken as an example. Specifically, the start position may be the latest symbol to which the low-priority uplink transmission is allowed to arrive. After that symbol, the low-priority uplink transmission cannot be continued. That is, the remaining transmission needs to be canceled if the low-priority uplink transmission does not end before the latest symbol. Alternatively, the start position for transmission cancellation of the low-priority uplink channel may be the position to which the low-priority uplink transmission must be transmitted to (if the end position of the low-priority uplink transmission is later than the start position). The start position is used as a boundary symbol position, and the processing manner thereof may be pre-agreed. For example, if it is agreed that the symbol of the start position is included in the canceled symbol, the cancellation starts from the symbol of the start position. If it is agreed that the symbol of the start position is not included in the canceled symbol, the cancellation starts after the symbol of the start position. Exemplarily, FIG. 5 is an example diagram of a channel conflict processing method according to an embodiment of the present application. For example, a high-priority uplink channel HARQ-ACK PUCCH of a UE and a low-priority uplink channel PUSCH of the UE overlap in time domain. Position C before a interval B before the start symbol of the high-priority uplink channel HARQ-ACK PUCCH may be the start position for transmission cancellation of the low-priority PUSCH. That is, if the transmission on the low-priority uplink channel HARQ-ACK PUCCH does not end at position C, the resource transmission after position C is canceled. If the transmission on the low-priority uplink channel ends at position C or before, it can mean that the transmission on the low-priority uplink channel PUSCH actually completes. In this embodiment of the present application, the interval B may include B1 and B2. B1 is required. B2 is optional. B1 may be $T_{proc,1}$ in standard TS38.214, any one of N, N1, $T_{proc,2}$, N2, or N3, or a pre-agreed value. N, N1, N2, or N3 may be an OFDM symbol interval defined in TS38.214 or TS38.213. $T_{proc,1}$ and $T_{proc,2}$ may be time intervals defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B1 is defined as $T_{proc,2}$, then in $T_{proc,2}$, $d_{2,1}=0$.

When subcarrier intervals used by PDCCHs corresponding to the HARQ-ACK PUCCH and the PDSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on the low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on CBGs, thereby improving the transmission efficiency of the low-priority PUSCH.

In an embodiment, the high-priority uplink channel is an HARQ-ACK PUCCH. Correspondingly, when the transmission resources on the high-priority uplink channel and the low-priority uplink channel overlap in time domain, the start position for transmission cancellation of the low-priority uplink channel is determined, including when transmission resources on the HARQ-ACK PUCCH and the low-priority uplink channel overlap in time domain, a position that is a threshold interval after the PDSCH end symbol corresponding to the HARQ-ACK PUCCH is used as the start position for transmission cancellation of the low-priority uplink channel.

Figure 6:
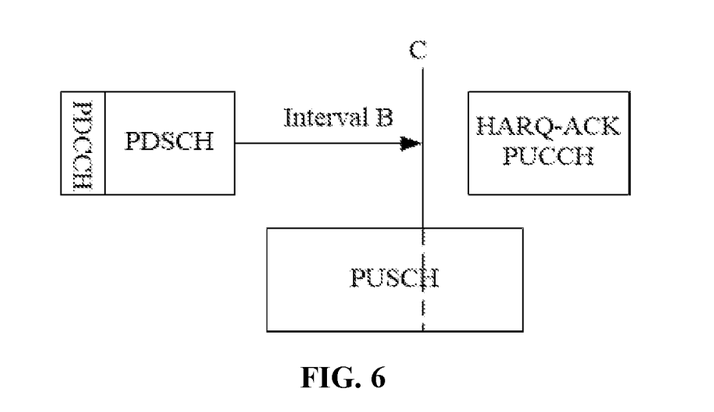
FIG. 6 is an example diagram of determining a start position for transmission cancellation according to an embodiment of the present application.

FIG. 6 is an example diagram of determining a start position for transmission cancellation according to an embodiment of the present application. Referring to FIG. 6, a high-priority uplink channel as an HARQ-ACK PUCCH and a low-priority uplink channel as a PUSCH are taken as an example. If the high-priority uplink channel HARQ-ACK PUCCH of a UE and the low-priority uplink channel PUSCH of the UE overlap in time domain, position C after a interval B that is the end of the last symbol of the PUSCH corresponding to the HARQ-ACK PUCCH is used as the start position for transmission cancellation of the low-priority uplink channel PUSCH. That is, if the transmission on the low-priority uplink channel PUSCH does not end at position C, the resource transmission after position C is canceled. If the transmission on the low-priority uplink channel ends at position C or before, it can mean that the transmission on the low-priority uplink channel PUSCH actually completes. In this embodiment of the present application, the interval B may include B1 and B2. B1 is required. B2 is optional. B1 may be $T_{proc,1}$ in standard TS38.214, any one of N, N1, $T_{proc,2}$, N2, or N3, or a pre-agreed value. N, N1, N2, or N3 may be an OFDM symbol interval defined in TS38.214 or TS38.213. $T_{proc,1}$ and $T_{proc,2}$ may be time intervals defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B1 is defined as $T_{proc,2}$, then in $T_{proc,2}$, $d_{2,1}=0$.

When subcarrier intervals used by PDCCHs corresponding to the HARQ-ACK PUCCH and the PUSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on the low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on CBGs, thereby improving the transmission efficiency of the low-priority PUSCH.

In an embodiment, the high-priority uplink channel is an aperiodic channel state information (A-CSI) PUSCH. Correspondingly, when the transmission resources on the high-priority uplink channel and the low-priority uplink channel overlap in time domain, the start position for transmission cancellation of the low-priority uplink channel is determined, including when transmission resources on the A-CSI PUSCH and the low-priority uplink channel overlap in time domain, a position that is a threshold interval after the end symbol of the PDCCH corresponding to the A-CSI PUSCH is used as the start position for transmission cancellation of the low-priority uplink channel.

In an embodiment, on the basis of the preceding embodiments of the present application, the value of the threshold interval is the latest interval value of $T_{proc,CSI}$ and $T'_{proc,CSI}$. The $T_{proc,CSI}$ and the $T'_{proc,CSI}$ are defined values in standards TS38.214 and TS38.213.

In an embodiment, the high-priority uplink channel is an A-CSI PUCCH. Correspondingly, when the transmission resources on the high-priority uplink channel and the low-priority uplink channel overlap in time domain, the start position for transmission cancellation of the low-priority uplink channel is determined, including when transmission resources on the A-CSI PUCCH and the low-priority uplink channel overlap in time domain, a position that is a threshold interval after the end symbol of the PDCCH corresponding to the A-CSI PUCCH is used as the start position for transmission cancellation of the low-priority uplink channel.

Figure 7:
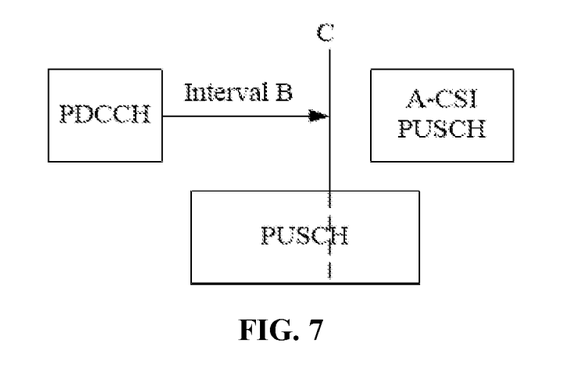
FIG. 7 is an example diagram of determining a start position for transmission cancellation according to an embodiment of the present application.

FIG. 7 is an example diagram of determining a start position for transmission cancellation according to an embodiment of the present application. Referring to FIG. 7, in a UE, a piece of high-priority aperiodic channel state information A-CSI triggered by a PDCCH is transmitted through a PUSCH. The PUSCH does not carry uplink data. In an embodiment, the A-CSI may be transmitted through a PUCCH. When the high-priority uplink channel A-CSI PUSCH conflicts with a low-priority PUSCH in time domain, to maximize the transmission efficiency of the low-priority uplink channel PUSCH, position C that is a interval B after the last end symbol of the PDCCH corresponding to the high-priority uplink channel A-CSI PUSCH is used as the start position for transmission cancellation of the low-priority PUSCH when overlapping in time domain occurs. That is, if the transmission on the low-priority uplink channel PUCCH does not end at position C, the resource transmission after position C is canceled. If the transmission on the low-priority uplink channel ends at position C or before, it can mean that the transmission on the low-priority uplink channel PUSCH actually completes. In this embodiment of the present application, the interval B may include B1 and B2. B1 is required. B2 is optional. B1 may be $T_{proc,CSI}$ and $T'_{proc,CSI}$ in standard TS38.214, any one of N, N1, $T_{proc,1}$, $T_{proc,2}$, N2, Z, Z' or N3, or a pre-agreed value. N, N1, N2, or N3 may be an OFDM symbol interval defined in TS38.214 or TS38.213. $T_{proc,1}$, $T_{proc,2}$, $T_{proc,CSI}$, and $T'_{proc,CSI}$ may be a time interval defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B 1 is defined as $T_{proc,2}$, then in $T_{proc,2}$, $d_{2,1}=0$.

When subcarrier intervals used by PDCCHs corresponding to the A-CSI PUSCH and the PUSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on the low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on CBGs, thereby improving the transmission efficiency of the low-priority PUSCH.

In an embodiment, the high-priority uplink channel is a scheduling request (SR) PUCCH or a beam failure recovery (BFR) PUCCH configured by a radio resource control (RRC) signaling. Correspondingly, when the transmission resources on the high-priority uplink channel and the low-priority uplink channel overlap in time domain, the start position for transmission cancellation of the low-priority uplink channel is determined, including when transmission resources on the SR PUCCH or the BFR PUCCH and the low-priority uplink channel overlap in time domain, a position that is a threshold interval before the start symbol of the SR PUCCH or the BFR PUCCH is used as the start position for transmission cancellation of the low-priority uplink channel.

Figure 8:
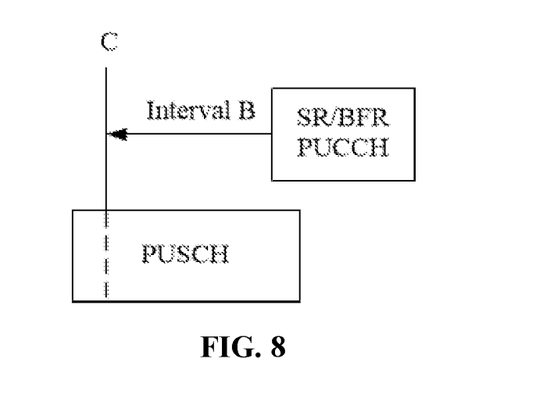
FIG. 8 is an example diagram of determining a start position for transmission cancellation according to an embodiment of the present application.

FIG. 8 is an example diagram of determining a start position for transmission cancellation according to an embodiment of the present application. Referring to FIG. 8, there is a high-priority uplink channel SR PUCCH or BFR PUCCH of a UE. The high-priority uplink channel conflicts with a low-priority PUSCH in time domain. It is to be understood that the low-priority uplink channel PUSCH may be a low-priority uplink channel HARQ-ACK PUCCH, a low-priority uplink channel SR PUCCH, a low-priority uplink channel CSI PUCCH, a low-priority uplink channel A-CSI PUSCH (without UL data), a low-priority uplink channel sounding reference signal (SRS), or a low-priority uplink channel BFR PUCCH. The processing manner is the same as that of the low-priority PUSCH. To maximize the transmission efficiency of the low-priority uplink channel PUSCH, when overlapping in time domain occurs, position C that is a interval B before the start symbol of the high-priority uplink channel SR PUCCH or BFR PUCCH is used as the start position for transmission cancellation of the low-priority PUSCH. That is, if the transmission on the low-priority uplink channel PUCCH does not end at position C, the resource transmission after position C is canceled. If the transmission on the low-priority uplink channel ends at position C or before, it can mean that the transmission on the low-priority uplink channel PUSCH actually completes. In this embodiment of the present application, the interval B may include B1 and B2. B1 is required. B2 is optional. B1 may be $T_{proc,CSI}$ and $T'_{proc,CSI}$ in standard TS38.214, any one of N, N1, $T_{proc,1}$, $T_{proc,2}$, N2, Z, Z' or N3, or a pre-agreed value. N, N1, N2, or N3 may be an OFDM symbol interval defined in TS38.214 or TS38.213. $T_{proc,1}$, $T_{proc,2}$, $T_{proc,CSI}$, and $T'_{proc,CSI}$ may be a time interval defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}=0$. If B1 is defined as $T_{proc,2}$, then in $T_{proc,2}$, $d_{2,1}=0$.

When subcarrier intervals used by PDCCHs corresponding to the SR PUCCH or BFR PUCCH and the PUSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on the low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on CBGs, thereby improving the transmission efficiency of the low-priority PUSCH.

In an embodiment, the high-priority uplink channel includes at least one of an HARQ-ACK PUCCH, an A-CSI PUSCH, an A-CSI PUCCH, an SR PUCCH, or a BFR PUCCH.

In another embodiment, the low-priority uplink channel includes at least one of a dynamic PUSCH, a semi-persistent PUSCH, an HARQ-ACK PUCCH, an SR PUCCH, a CSI PUCCH, an A-CSI PUSCH, an A-CSI PUCCH, an SRS, or a BFR PUCCH.

In an embodiment, in the case where the high-priority transmission is a PUCCH for transmitting HARQ-ACK, the threshold interval is B1 or the sum of B1 and B2. B1 is a first set value. For example, the first set value may be $T_{proc,1}$ in TS38.214, N1, or a pre-agreed value. B2 is determined according to the processing capability reported by a terminal. The value of B2 is 0, 1, or 2.

In an embodiment, in the case where the high-priority transmission is a PUCCH for transmitting scheduling request, the threshold interval is B1 or the sum of B1 and B2. B1 is a second set value. For example, the second set value may be $T_{proc,1}$ in TS38.214, N1, or a pre-agreed value. B2 is determined according to the processing capability reported by a terminal. The value of B2 is 0, 1, or 2.

In an embodiment, in the case where the high-priority transmission is a PUCCH for transmitting channel state information, the threshold interval is B1 or the sum of B1 and B2. B1 is a third set value. For example, the third set value may be $T_{proc,CSI}$ in TS38.214, Z, or a pre-agreed value. B2 is determined according to the processing capability reported by a terminal. The value of B2 is 0, 1, or 2.

In an embodiment, in the case where the high-priority transmission is a PUSCH for transmitting channel state information, the threshold interval is B1 or the sum of B1 and B2. B1 is a fourth set value. For example, the fourth set value may be $T_{proc,2}$ in TS38.214, N2, or a pre-agreed value. B2 is determined according to the processing capability reported by a terminal. The value of B2 is 0, 1, or 2.

In an embodiment, in the case where the high-priority transmission is a PUCCH for transmitting BFR, the threshold interval is B1 or the sum of B1 and B2. B1 is a fifth set value. For example, the fifth set value may be $T_{proc,1}$ in TS38.214, N1, or a pre-agreed value. B2 is determined according to the processing capability reported by the terminal. The value of B2 is 0, 1, or 2.

In an embodiment, in the case where the high-priority transmission is a dynamic scheduling PUCCH for transmitting uplink data, the threshold interval is B1 or the sum of B1 and B2. B1 is a sixth set value. For example, the sixth set value may be $T_{proc,2}$ in TS38.214, N2, or a pre-agreed value. B2 is determined according to the processing capability reported by the terminal. The value of B2 is 0, 1, or 2.

In an embodiment, in the case where the high-priority transmission is a semi-persistent scheduling PUSCH for transmitting uplink data, the threshold interval is B1 or the sum of B1 and B2. B1 is a seventh set value. For example, the seventh set value may be $T_{proc,2}$ in TS38.214, N2, or a pre-agreed value. B2 is determined according to the processing capability reported by the terminal. The value of B2 is 0, 1, or 2.

In an embodiment, in the case where the high-priority transmission is an SRS, the threshold interval is B1 or the sum of B1 and B2. B1 is an eighth set value. The eighth set value may be $T_{proc,2}$ in TS38.214, N2, or a pre-agreed value. B2 is determined according to the processing capability reported by the terminal. The value of B2 is 0, 1, or 2.

In an embodiment, in the case where the high-priority transmission is a PUCCH for transmitting A-CSI, the threshold interval is B1 or the sum of B1 and B2. B1 is a ninth set value. For example, the ninth set value may be $T_{proc,CSI}$ in TS38.214, Z, or a pre-agreed value. B2 is determined according to the processing capability reported by the terminal. The value of B2 is 0, 1, or 2.

The threshold interval may include B1. Alternatively, the threshold interval includes B1 and B2. B1 may be $T_{proc,1}$ in TS38.214, one of N, N1, $T_{proc,2}$, N2, Z, Z', $T_{proc,CSI}$, or N3, or a pre-agreed value. Units of N, N1, N2, N3, Z and Z' are symbols. N, N1, N2, N3, Z and Z' are values defined in TS38.214 or TS38.213. $T_{proc,1}$, $T_{proc,2}$, and $T_{proc,CSI}$ are time and can be slightly adjusted according to an actual application. $T_{proc,1}$, $T_{proc,2}$, and $T_{proc,CSI}$ are values defined in TS38.214 or TS38.213. The preceding symbols and time can be converted to each other. If B1 is $T_{proc,1}$, then in $T_{proc,1}$, $d_{1,1}$=0. If B1 is $T_{proc,2}$, then in $T_{proc,2}$, $d_{2,1}$=0. The value of B2 is one of 0, 1, or 2. The unit of B2 is symbol. B2 is determined according to the processing capability reported by a UE. It is to be noted that the manner for determining the duration of the threshold interval here is applicable to determining the duration of the threshold interval in all embodiments of the present application described above.

Figure 9:
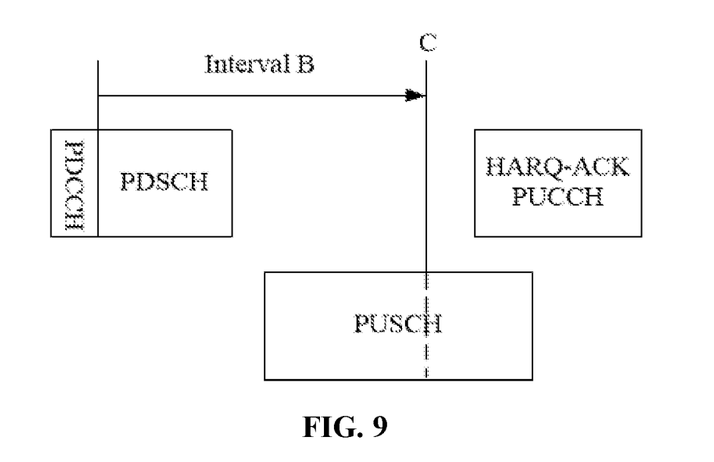
FIG. 9 is an example diagram of determining a start position for transmission cancellation according to an embodiment of the present application.

FIG. 9 is an example diagram of determining a start position for transmission cancellation according to an embodiment of the present application. For example, a high-priority HARQ-ACK PUCCH of a UE and a PUSCH of the UE overlap in time domain. Position C that is a interval B after the end of the last symbol of the PDCCH corresponding to the high-priority HARQ-ACK PUCCH is used as the start position for transmission cancellation of the low-priority PUSCH. That is, if the transmission on the low-priority uplink channel HARQ-ACK PUCCH does not end at position C, the resource transmission after position C is canceled. If the transmission on the low-priority uplink channel ends at position C or before, it can mean that the transmission on the low-priority uplink channel PUSCH actually completes. In this embodiment of the present application, the interval B may include B1 and B2. B1 is required. B2 is optional. B1 may be $T_{proc,1}$ in standard TS38.214, any one of N, N1, $T_{proc,2}$, N2, or N3, or a pre-agreed value. N. N1, N2, or N3 may be an OFDM symbol interval defined in TS38.214 or TS38.213. $T_{proc,1}$ and $T_{proc,2}$ may be time intervals defined in TS38.214 or TS38.213. B2 may be one of OFDM symbols, such as 0, 1, or 2, and may be determined according to the processing capability reported by the UE. For example, if B1 is $T_{proc,1}$, then in $T_{proc,1}$, $d_{1,1}$=0. If B1 is defined as $T_{proc,2}$, then in $T_{proc,2}$, $d_{2,1}$=0.

Figure 10:
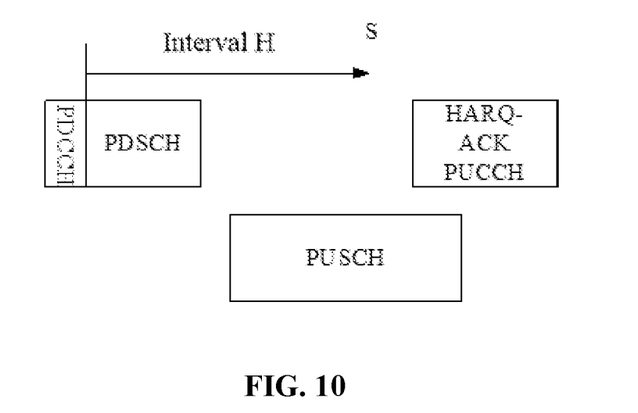
FIG. 10 is a timing diagram of channels of different priorities according to an embodiment of the present application.

When subcarrier intervals used by PDCCHs corresponding to the HARQ-ACK PUCCH and the PDSCH are not exactly the same, the interval B is determined by obtaining the subcarrier interval with the maximum interval B from the subcarrier intervals used. The interval B may specifically refer to the maximum time interval. If position C corresponds to an OFDM symbol (not at the end of the OFDM symbol) transmitted on the low-priority PUSCH, the low-priority PUSCH is canceled starting from the OFDM symbol. This is because the subcarrier interval used when position C is determined is different from the subcarrier interval used by the low-priority PUSCH. This may cause that when the symbol is mapped to the low-priority PUSCH transmission at position C, the boundary of the symbol is not corresponded. Thus, in some cases, the low-priority PUSCH may be transmitted to position C. In this case, the low-priority uplink channel has an explicit end position, facilitating the decoding of the base station and partial repeat mechanism based on CBGs, thereby improving the transmission efficiency of the low-priority PUSCH. Correspondingly, when the channel conflict between the high-priority uplink channel HARQ-ACK PUCCH and the low-priority PUSCH is processed, the transmission start position needs to satisfy a new timing relationship. The start symbol of the high-priority HARQ-ACK PUCCH is not earlier than position S that is a interval H after the end of the PDCCH corresponding to the PDSCH corresponding to the HARQ-ACK PUCCH (as shown in FIG. 10). The interval H is defined as that the interval H includes H1 and H2. H1 is required. H2 is optional. H1 may be $T_{proc,1}$ in TS38.214, one of N, N1, $T_{proc,2}$, N2, or N3, or a pre-agreed value. (Units of N, N1, N2, and N3 are symbols. N, N1, N2, and N3 are values defined in TS38.214 or TS38.213. $T_{proc,1}$ and $T_{proc,2}$ are symbols converted to time. $T_{proc,1}$ and $T_{proc,2}$ are slightly adjusted according to different situations, but are values defined in TS38.214 or TS38.213. It is to be noted that symbols and time can be converted to each other.) This only needs to be pre-agreed. If H2 is selected, the value of H2 is a symbol among 0, 1, or 2. H2 is determined according to the processing capability reported by the UE. When subcarrier intervals used by PDCCHs corresponding to the HARQ-ACK PUCCH, the PUSCH, and the PDSCH are not exactly the same, the interval H is determined by obtaining the subcarrier interval with the maximum interval H from the subcarrier intervals used. The interval H actually refers to the maximum time interval. If position S corresponds to an OFDM symbol (not at the end of the OFDM symbol) transmitted on the low-priority PUSCH, the low-priority PUSCH is canceled starting from the OFDM symbol (including the OFDM symbol). This is because the subcarrier interval used when position S is determined is different from the subcarrier interval used by the low-priority PUSCH. This may cause that when the symbol is mapped to the low-priority PUSCH transmission at position S, the boundary of the symbol is not corresponded.

Figure 11:
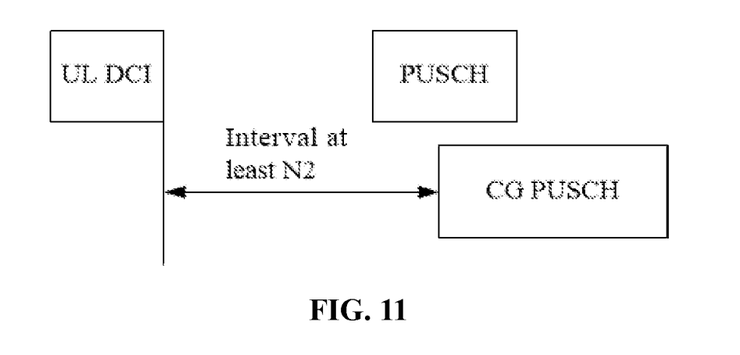
FIG. 11 is a diagram of determining a start position for transmission cancellation.
Figure 12:
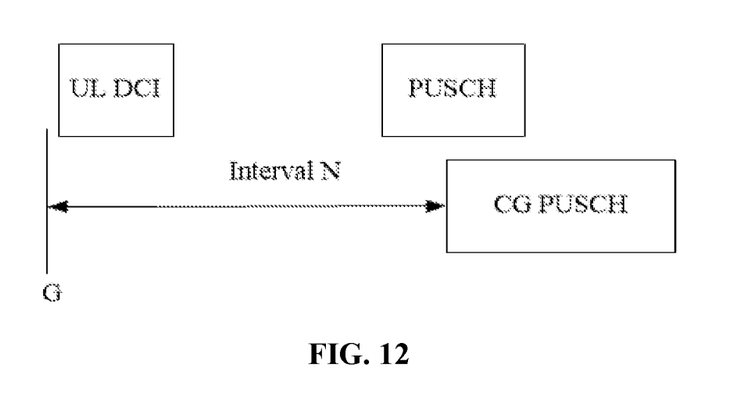
FIG. 12 is an example diagram of determining a start position for transmission cancellation according to an embodiment of the present application.

FIG. 11 is a diagram of determining a start position for transmission cancellation. Referring to FIG. 11, a dynamic grant (DG) PUSCH transmission is scheduled by a UL DCI in a UE. The transmission resources on the DG PUSCH have a conflict with a configured grant (CG) PUSCH transmission occasion in time domain. Therefore, the UL DCI transmission position is strictly limited. For example, a protocol is limited to that the interval between the end of the UL DCI and the start symbol of the CG PUSCH occasion is at least N2 (N2 is defined in TS38.214). This limitation ensures that the DG PUSCH is transmitted. Because, in this case, after the UL DCI reaches a medium access control (MAC) layer, even if there is the CG PUSCH which needs to be transmitted in the MAC layer at the same time, in the protocol rule, the DG PUSCH in the MAC layer is preferentially transmitted, and the CG PUSCH is processed according to the delayed rule. This limitation brings the disadvantage that if the transmission is not actually performed at the CG PUSCH occasion, the occasion of scheduling the DG PUSCH is limited. It is obvious that a constraint is imposed on the dynamic scheduling DG PUSCH. Because the transmission is not actually occurring on the CG PUSCH, the time to schedule the DG PUSCH at the resource position on the CG PUSCH in time is wasted. If the DG PUSCH has high priority at this time, for example, for delay demanding strict URLLC service, the impact on service transmission at this time may be fatal. That is, if the DG PUSCH is of high priority and the CG PUSCH is of low priority, this limitation is not reasonable. Therefore, to overcome the disadvantage in the protocol, the following improvements are proposed. Referring to FIG. 12, if the base station schedules the DG PUSCH for the UE, the DG PUSCH transmission position and the CG PUSCH transmission occasion of the UE overlap in time domain, the DG PUSCH is of high priority (the priority of the CG PUSCH may be high or low), and the end of the UL DCI corresponding to the DG PUSCH (the end of the last symbol of the UL DCI) is later than point G, the base station expects the UE to process DG PUSCH transmission and discard CG PUSCH transmission. Similarly, if the UE receives a DG PUSCH scheduled by the UL DCI, the DG PUSCH transmission position and the CG PUSCH transmission occasion of the UE overlap in time domain, the DG PUSCH is of high priority (the priority of the CG PUSCH may be high or low), and the end of the UL DCI is later than point G, the UE processes the DG PUSCH transmission and discards the CG PUSCH transmission. Point G is defined as the position that is a interval N before the start symbol of the CG PUSCH. N may be N2 or $T_{proc,2}$ in protocol 38.214. In an embodiment, if the base station schedules the DG PUSCH for the UE, the DG PUSCH transmission position and the CG PUSCH transmission occasion of the UE overlap in time domain and the DG PUSCH and the CG PUSCH have the same priority, the UE does not expect the end of the UL DCI corresponding to the DG PUSCH (the end of the last symbol of the UL DCI) to be later than point G. That is, the base station prohibits that the end of UL DCI (the end of the last symbol of the UL DCI) for scheduling the DG PUSCH of the UE is later than point G. Point G is defined as the position that is a interval N before the start symbol of the CG PUSCH. N may be N2 or $T_{proc,\ 2}$ in protocol 38.214.

Figure 13:
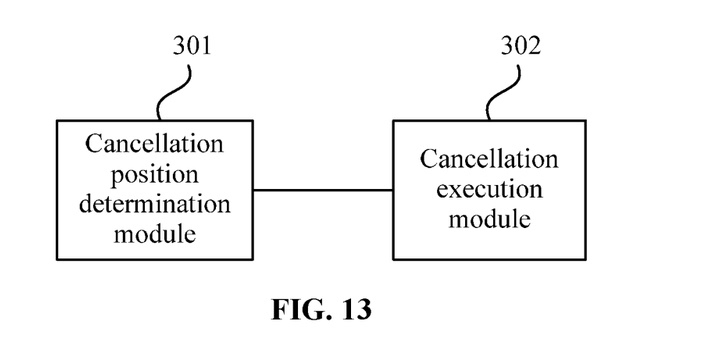
FIG. 13 is a diagram illustrating the structure of a channel conflict processing apparatus according to an embodiment of the present application.

FIG. 13 is a diagram illustrating the structure of a channel conflict processing apparatus according to an embodiment of the present application. The apparatus can execute the channel conflict processing method provided by any embodiment of the present application and has function modules and beneficial effects corresponding to the method. The apparatus may be implemented by software and/or hardware. The apparatus specifically includes a cancellation position determination module 301 and a cancellation execution module 302.

The cancellation position determination module 301 is configured to, when a transmission resource on a high-priority uplink channel of a UE and a transmission resource on a low-priority uplink channel of the UE overlap in time domain, determine the start position for transmission cancellation of the low-priority uplink channel.

The cancellation execution module 302 is configured to cancel the transmission resource on the low-priority uplink channel according to the start position for transmission cancellation.

According to technical solutions in this embodiment of the present application, when the channel conflict occurs, the cancellation position determination module 301 determines the start position for transmission cancellation of the low-priority uplink channel, and the cancellation execution module 302 cancels the transmission resources on the low-priority uplink channel according to the start position for transmission cancellation, thereby reducing the influence of the high-priority uplink channel on canceling the low-priority uplink channel during channel conflict, and improving the uplink transmission efficiency of the low-priority uplink channel.

On the basis of the preceding embodiments of the present application, the cancellation position determination module 301 includes a first position acquisition unit.

The first position acquisition unit is configured to determine the position that is a threshold interval after the end symbol of the channel corresponding to the high-priority uplink channel as the start position for transmission cancellation.

On the basis of the preceding embodiments of the present application, the cancellation position determination module 301 further includes a second position acquisition unit.

The second position acquisition unit is configured to determine the position that is a threshold interval before the start symbol of the high-priority uplink channel as the start position for transmission cancellation.

On the basis of the preceding embodiments of the present application, the threshold interval in the first position acquisition unit and/or the second position acquisition unit includes at least one of a time interval or an OFDM symbol interval.

On the basis of the preceding embodiments of the present application, the threshold interval in the first position acquisition unit and/or the second position acquisition unit includes a first threshold interval and a second threshold interval. Alternatively, the threshold interval includes a first threshold interval.

On the basis of the preceding embodiments of the present application, the cancellation execution module 302 includes a cancellation transmission unit.

The cancellation transmission unit is configured to cancel the transmission resource on the low-priority uplink channel from the start position for transmission cancellation.

On the basis of the preceding embodiments of the present application, the high-priority uplink channel of the channel conflict processing apparatus includes at least one of an HARQ-ACK PUCCH, an A-CSI PUSCH, an SR PUCCH, or a BFR PUCCH.

On the basis of the preceding embodiments of the present application, the low-priority uplink channel of the channel conflict processing apparatus includes at least one of a dynamic PUSCH, a semi-persistent PUSCH, an HARQ-ACK PUCCH, an SR PUCCH, a CSI PUCCH, an A-CSI PUSCH, an A-CSI PUCCH, an SRS, or a BFR PUCCH.

On the basis of the preceding embodiments of the present application, the cancellation position determination module 301 includes a first processing unit. The high-priority uplink channel is an HARQ-ACK PUCCH. The first processing unit is specifically configured to, when transmission resources on the HARQ-ACK PUCCH and the low-priority uplink channel overlap in time domain, use a position that is a threshold interval after the end symbol of the PDSCH corresponding to the HARQ-ACK PUCCH as the start position for transmission cancellation of the low-priority uplink channel.

On the basis of the preceding embodiments of the present application, the cancellation position determination module 301 includes a second processing unit. The high-priority uplink channel is an A-CSI PUSCH. The second processing unit is specifically configured to, when transmission resources on the A-CSI PUSCH and the low-priority uplink channel overlap in time domain, use a position that is a threshold interval after the end symbol of the PDCCH corresponding to the A-CSI PUSCH as the start position for transmission cancellation of the low-priority uplink channel.

On the basis of the preceding embodiments of the present application, the value of the threshold interval in the second processing unit is the latest interval value of $T_{proc,CSI}$ and $T'_{proc,CSI}$. The $T_{proc,CSI}$ and the $T'_{proc,CSI}$ are defined values in standards TS38.214 and TS38.213.

On the basis of the preceding embodiments of the present application, the cancellation position determination module 301 includes a second processing unit. The high-priority uplink channel is an A-CSI PUCCH. The second processing unit is specifically configured to, when transmission resources on the A-CSI PUCCH and the low-priority uplink channel overlap in time domain, use a position that is a threshold interval after the end symbol of the PDCCH corresponding to the A-CSI PUCCH as the start position for transmission cancellation of the low-priority uplink channel.

On the basis of the preceding embodiments of the present application, the cancellation position determination module 301 includes a third processing unit. The high-priority uplink channel is an SR PUCCH or a BFR PUCCH configured by a RRC signaling. The third processing unit is specifically configured to, when transmission resources on the SR PUCCH or the BFR PUCCH and the low-priority uplink channel overlap in time domain, use a position that is a threshold interval before the start symbol of the SR PUCCH or the BFR PUCCH as the start position for transmission cancellation of the low-priority uplink channel.

Figure 14:
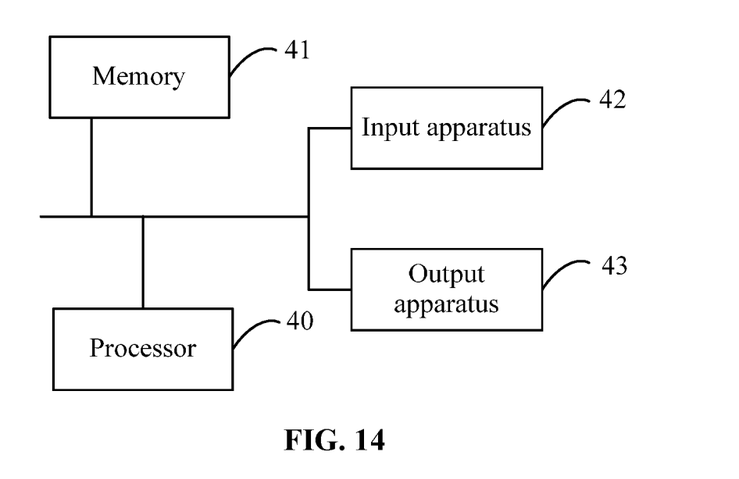
FIG. 14 is a diagram illustrating the structure of a device according to an embodiment of the present application.

FIG. 14 is a diagram illustrating the structure of a device according to an embodiment of the present application. As shown in FIG. 14, the device includes a processor 40, a memory 41, an input apparatus 42, and an output apparatus 43. One or more processors 40 may be disposed in the device and one processor 40 is taken as an example in FIG. 14. The processor 40, the memory 41, the input apparatus 42 and the output apparatus 43 in the device may be connected by a bus or other manners. Connecting by a bus is used as an example in FIG. 14.

As a computer-readable storage medium, the memory 41 may be configured to store a software program, a computer executable program, and a module, for example, a module (cancellation position determination module 301 and cancellation execution module 302) corresponding to the channel conflict processing apparatus in the embodiments of the present application. The processor 40 executes various function applications and data processing of the devices, that is, implements the preceding channel conflict processing method, by executing software programs, instructions and modules stored in the memory 41.

The memory 41 may mainly include a program storage region and a data storage region. The program storage region may store an operating system and an application program required by at least one function. The data storage region may store data created depending on the use of a terminal. Additionally, the memory 41 may include a high-speed random-access memory and may also include a nonvolatile memory such as at least one disk memory, a flash memory, or another nonvolatile solid-state memory. In some examples, the memory 41 may include memories which are remotely disposed relative to the processor 40, and these remote memories may be connected to the device via a network. Examples of the preceding network include, but are not limited to, the Internet, an intranet, a local area network, a mobile communication network and a combination thereof.

The input apparatus 42 may be configured to receive inputted digital or character information and generate key signal input related to user settings and function control of the device. The output apparatus 43 may include display devices such as a display screen.

An embodiment of the present application further provides a storage medium including computer-executable instructions. The computer-executable instructions are configured to execute a channel conflict processing method when executed by a computer processor. The method includes the following.

When the transmission resource on a high-priority uplink channel of a UE and the transmission resource on a low-priority uplink channel of the UE overlap in time domain, the start position for transmission cancellation of the low-priority uplink channel is determined.

The transmission resource on the low-priority uplink channel is canceled according to the start position for transmission cancellation.

In the storage medium containing computer-executable instructions provided by embodiments of the present application, the computer-executable instructions execute not only the preceding method operations but also related operations in the software installation method provided by any embodiment of the present application.

Through the preceding description of the embodiments, it is clear to those skilled in the art that the embodiments of the present application may be accomplished through software plus necessary universal hardware or through hardware, but in many cases, the former implementation is preferred. Based on this understanding, the technical solutions in the embodiments of the present application may be embodied in the form of a software product. The software product in a computer may be stored in a computer-readable storage medium such as a floppy disk, read-only memory (ROM), random-access memory (RAM), flash memory, hard disk, or optical disk in the computer and includes multiple instructions for enabling a computer device (which may be a personal computer, a server, or a network device) to execute the method in any embodiment of the present application.

The above are example embodiments of the present application and are not intended to limit the scope of the present application.

It is to be understood by those skilled in the art that the term "user terminal" covers any suitable type of radio UE, for example, a mobile phone, a portable data processing apparatus, a portable web browser, or a vehicle-mounted mobile station.

In general, multiple embodiments of the present application may be implemented in hardware, dedicated circuits, software, logics, or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in the memory. The memory may be of any type suitable for the local technical environment and may be implemented using any suitable data storage technology, such as, but not limited to, a read-only memory (ROM), a random-access memory (RAM), and an optical memory apparatus and system (a digital video disc (DVD), or a compact disc (CD)). The computer-readable medium may include a non-transitory storage medium. The data processor may be of any type suitable to the local technical environment, such as, but is not limited to, a general-purpose computer, a special-purpose computer, a microprocessor, a digital signal processor (DSP), an application specific integrated circuit (ASIC), a field-programmable gate array (FPGA), and a processor based on a multi-core processor architecture.

What is claimed is:

1. A channel conflict processing method, comprising:
   in response to a transmission resource of a high-priority uplink channel of a user equipment (UE) and a transmission resource of a low-priority uplink channel of the UE overlapping in time domain, determining a start symbol of the high-priority uplink channel is not earlier than an interval H after an end of a Physical Downlink Control Channel (PDCCH) corresponding to a Physical Downlink Shared Channel (PDSCH) corresponding to the high-priority uplink channel;
   wherein the interval H is determined based on H1 and H2, H1 is N1 symbols defined in TS38.214, a value of H2 is 0, 1 or 2 symbols and H2 is determined according to processing capability reported by the UE; and
   wherein the high-priority uplink channel is a hybrid automatic repeat request-acknowledgements physical uplink control channel (HARQ-ACK PUCCH).

2. The method according to claim 1, further comprising:
   in response to the transmission resource of the high-priority uplink channel of the UE, and the transmission resource of the low-priority uplink channel of the UE overlapping in time domain, determining a start position for transmission cancellation of the low-priority uplink channel; and
   canceling the transmission resource of the low-priority uplink channel according to the start position for transmission cancellation.

3. The method according to claim 2, wherein determining the start position for transmission cancellation of the low-priority uplink channel comprises one of:
   determining a position that is a threshold interval after end of an end symbol of a channel corresponding to the high-priority uplink channel as the transmission cancellation start position;
   and
   determining a position that is a threshold interval before start of a start symbol of the high-priority uplink channel as the start position for transmission cancellation.

4. The method according to claim 3, wherein the threshold interval comprises at least one of a time amount interval, or, an orthogonal frequency-division multiplexing (OFDM) symbol interval.

5. The method according to claim 3, wherein the threshold interval comprises a first threshold interval and a second threshold interval, or the threshold interval comprises a first threshold interval.

6. The method according to claim 2, wherein canceling the transmission resource on the low-priority uplink channel according to the start position for transmission cancellation comprises:
canceling the transmission resource on the low-priority uplink channel from the start position for transmission cancellation.

7. The method according to claim 1, wherein the low-priority uplink channel comprises at least one of a dynamic PUSCH, a semi-persistent PUSCH, a HARQ-ACK PUCCH, an SR PUCCH, a channel state information physical uplink control channel (CSI PUCCH), an A-CSI PUSCH, an A-CSI PUCCH, a sounding reference signal (SRS), or a BFR PUCCH.

8. The method according to claim 2, wherein in a case where the transmission resource on the high-priority uplink channel and the transmission resource on the low-priority uplink channel overlap in time domain, determining the start position for transmission cancellation of the low-priority uplink channel comprises:
in response to a transmission resource on the HARQ-ACK PUCCH and the transmission resource on the low-priority uplink channel overlapping in time domain, using a position that is a threshold interval after end an end symbol of a PDSCH corresponding to the HARQ-ACK PUCCH as the start position for transmission cancellation of the low-priority uplink channel.

9. The method according to claim 3, wherein the threshold interval comprises at least one of a time amount interval, or, an orthogonal frequency-division multiplexing (OFDM) symbol interval.

10. The method according to claim 3, wherein the threshold interval comprises a first threshold interval and a second threshold interval, or the threshold interval comprises a first threshold interval.

11. A device, comprising:
at least one processor; and
a memory configured to store at least one program,
wherein when executed by the at least one processor, the at least one program causes the at least one processor to perform operations, the operations comprising:
in response to a transmission resource of a high-priority uplink channel of a user equipment (UE) and a transmission resource of a low-priority uplink channel of the UE overlapping in time domain, determining a start symbol of the high-priority uplink channel is not earlier than an interval H after an end of a Physical Downlink Control Channel (PDCCH) corresponding to a Physical Downlink Shared Channel (PDSCH) corresponding to the high-priority uplink channel;
wherein the interval H is determined based on H1 and H2, H1 is N1 symbols defined in TS38.214, a value of H2 is 0, 1 or 2 symbols and H2 is determined according to processing capability reported by the UE; and
wherein the high-priority uplink channel is a hybrid automatic repeat request-acknowledgements physical uplink control channel (HARQ-ACK PUCCH).

12. The device according to claim 11, the operations further comprise:
in response to the transmission resource on the high-priority uplink channel of the UE, and the transmission resource on the low-priority uplink channel of the UE overlapping in time domain, determining a start position for transmission cancellation of the low-priority uplink channel; and
canceling the transmission resource on the low-priority uplink channel according to the start position for transmission cancellation.

13. The device according to claim 12, wherein determining the start position for transmission cancellation of the low-priority uplink channel comprises one of:
determining a position that is a threshold interval after end of an end symbol of a channel corresponding to the high-priority uplink channel as the transmission cancellation start position;
and
determining a position that is a threshold interval before start of a start symbol of the high-priority uplink channel as the start position for transmission cancellation.

14. The device according to claim 13, wherein the threshold interval comprises at least one of a time amount interval, or, an orthogonal frequency-division multiplexing (OFDM) symbol interval.

15. A non-transitory computer-readable storage medium configured to store a computer program which, when executed by a processor, performs operations, the operations comprising:
in response to a transmission resource of a high-priority uplink channel of a user equipment (UE) and a transmission resource of a low-priority uplink channel of the UE overlapping in time domain, determining a start symbol of the high-priority uplink channel is not earlier than an interval H after an end of a Physical Downlink Control Channel (PDCCH) corresponding to a Physical Downlink Shared Channel (PDSCH) corresponding to the high-priority uplink channel;
wherein the interval H is determined based on H1 and H2, H1 is N1 symbols defined in TS38.214, a value of H2 is 0, 1 or 2 symbols and H2 is determined according to processing capability reported by the UE; and
wherein the high-priority uplink channel is a hybrid automatic repeat request-acknowledgements physical uplink control channel (HARQ-ACK PUCCH).

* * * * *